US009593867B2

(12) United States Patent
Seery et al.

(10) Patent No.: US 9,593,867 B2
(45) Date of Patent: Mar. 14, 2017

(54) LARGE SCALE GROUND MOUNTING SYSTEM FOR PHOTOVOLTAICS

(71) Applicants: Martin Seery, San Rafael, CA (US); Isaac Childress, San Anselmo, CA (US); Tim Henson, San Francisco, CA (US); Kate Miller, Berkeley, CA (US); Clara Nagy, San Francisco, CA (US)

(72) Inventors: Martin Seery, San Rafael, CA (US); Isaac Childress, San Anselmo, CA (US); Tim Henson, San Francisco, CA (US); Kate Miller, Berkeley, CA (US); Clara Nagy, San Francisco, CA (US)

(73) Assignee: SunLink Corporation, San Rafael, CA (US)

( * ) Notice: Subject to any disclaimer, the term of this patent is extended or adjusted under 35 U.S.C. 154(b) by 494 days.

(21) Appl. No.: 13/928,656

(22) Filed: Jun. 27, 2013

(65) Prior Publication Data

US 2014/0014155 A1    Jan. 16, 2014

Related U.S. Application Data

(60) Provisional application No. 61/669,919, filed on Jul. 10, 2012.

(51) Int. Cl.
*F24J 2/52* (2006.01)
*H02S 20/00* (2014.01)
(Continued)

(52) U.S. Cl.
CPC .......... *F24J 2/5232* (2013.01); *F24J 2/5258* (2013.01); *F24J 2/5264* (2013.01); *H02S 20/00* (2013.01);
(Continued)

(58) Field of Classification Search
CPC ..... F24J 2/5209; F24J 2/5235; F24J 2002/529
See application file for complete search history.

(56) References Cited

U.S. PATENT DOCUMENTS 5,983,577 A * 11/1999 Hays ................. E04B 1/24
52/640
2003/0070368 A1* 4/2003 Shingleton ........... F24J 2/5205
52/173.3
(Continued)

FOREIGN PATENT DOCUMENTS

DE    202009005576 U1 *  7/2009
WO    WO 2010130736 A2 * 11/2010

OTHER PUBLICATIONS

Definition of "purlin" [retrieved from http://www.thefreedictionary.com/purlin on Sep. 25, 2015].*

*Primary Examiner* — Eric R Smith
(74) *Attorney, Agent, or Firm* — Reed Smith LLP

(57) ABSTRACT

A mounting system for mounting photovoltaic panels, which provides for a quick and easy assembly. The ground mount system for photovoltaic panels includes at least two vertical supports, wherein attached to each vertical support are a T plate connected to a vertical support, a post frame connected to the T plate, and a kicker brace connected between the vertical support and the post frame. The ground mount system may further include a first C-Purlin connected to a first end of the post frame, a second C-Purlin connected to a second end of the post frame, a purlin tie connected between the first C-Purlin and the second C-Purlin. Panel clamps secure a photovoltaic panel assembly to the mounting system.

9 Claims, 9 Drawing Sheets

(51) Int. Cl.
*H01L 31/042* (2014.01)
*H02S 20/10* (2014.01)

(52) U.S. Cl.
CPC .............. *F24J 2/526* (2013.01); *H02S 20/10* (2014.12); *Y02E 10/47* (2013.01); *Y02E 10/50* (2013.01)

(56) References Cited

U.S. PATENT DOCUMENTS

| | | | | |
|---|---|---|---|---|
| 2009/0256046 | A1* | 10/2009 | Hausner | F24J 2/5232 248/398 |
| 2010/0089389 | A1* | 4/2010 | Seery | F24J 2/5211 126/608 |
| 2010/0127142 | A1* | 5/2010 | Genschorek | F24J 2/5232 248/222.14 |
| 2010/0276558 | A1* | 11/2010 | Faust | F24J 2/5205 248/222.14 |
| 2011/0024582 | A1* | 2/2011 | Gies | F24J 2/5239 248/122.1 |
| 2011/0272367 | A1* | 11/2011 | Kufner | F24J 2/5232 211/41.1 |
| 2012/0056066 | A1* | 3/2012 | Habdank | F24J 2/5232 248/419 |
| 2012/0090665 | A1* | 4/2012 | Zuritis | F24J 2/5232 136/251 |
| 2012/0298444 | A1* | 11/2012 | O'Reilly | A62B 35/0056 182/3 |
| 2013/0092215 | A1* | 4/2013 | Schroeder | F24J 2/5232 136/251 |

* cited by examiner

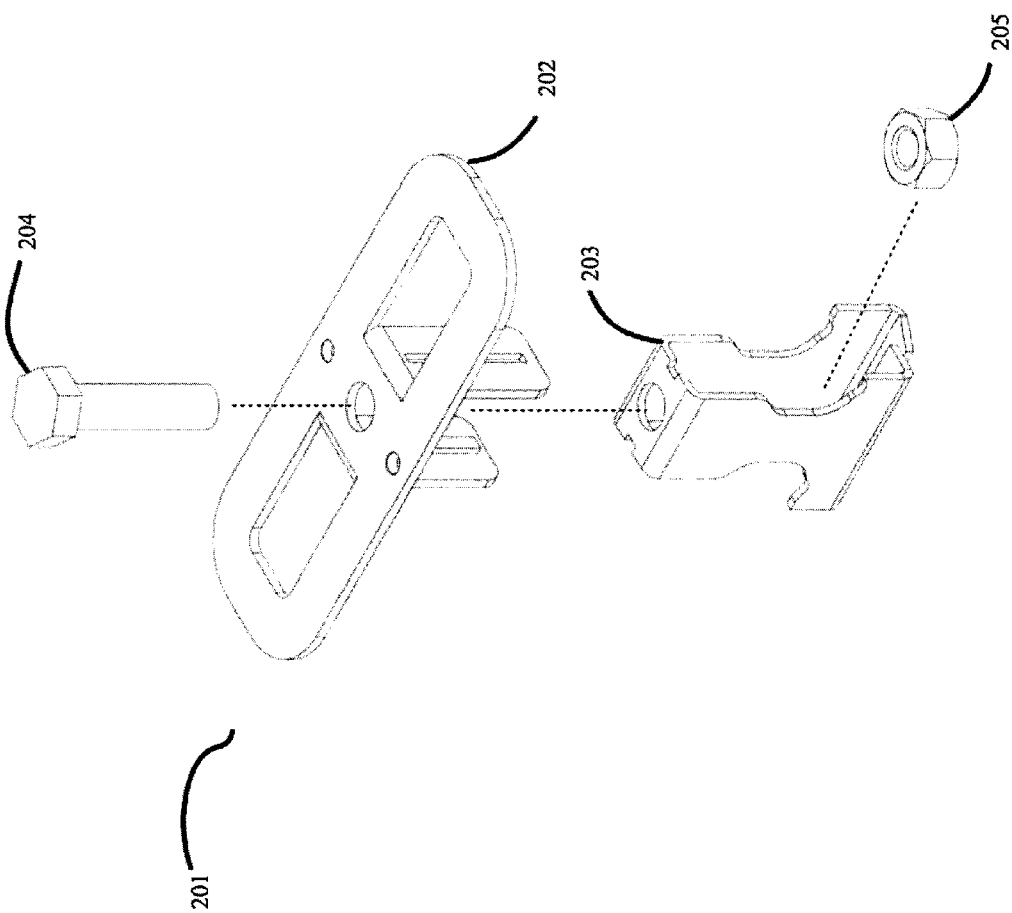

US 9,593,867 B2

LARGE SCALE GROUND MOUNTING SYSTEM FOR PHOTOVOLTAICS

This application claims the benefit of U.S. Provisional Application No. 61/669,919, filed Jul. 10, 2012, entitled LARGE SCALE GROUND MOUNTING SYSTEM FOR PHOTOVOLTAICS, the disclosure of which is herein incorporated by reference.

BACKGROUND OF THE INVENTION

1. Field of the Invention

The present invention relates generally to photovoltaic mounting systems.

2. Description of the Related Art

With a growing need to harness solar power, larger and larger solar panel installations are being installed. These large scale installations are often installed in the ground. For these large installations to be successfully funded and interconnected, they must compete with existing energy sources such as natural gas and coal. Therefore the costs of these large scale ground mounted installation must be extremely economic. Specifically, the labor rates for installation is the most scrutinized cost as it often is greater than the material costs for the equipment. Utilities and municipalities are considering larger scale photovoltaic installations in areas of extreme environmental forces, such as very high wind or massive amounts of snow. The design of the large scale ground mount systems must be designed to survive these environmental forces while maintaining their economic appeal.

SUMMARY OF THE INVENTION

In general, the present invention is a mounting system for mounting photovoltaic panels. According to one embodiment, a ground mount system for photovoltaic panels comprises at least two vertical supports, wherein attached to each vertical support are: a T plate connected to a vertical support; a post frame connected to the T plate; and a kicker brace connected between the vertical support and the post frame. The ground mount system may further comprise a first C-Purlin connected to a first end of the post frame, a second C-Purlin connected to a second end of the post frame, a purlin tie connected between the post frame and a C-Purlin. A purlin torsion brace may be connected between the second C-Purlin and a panel frame.

Affixed to the ground mount system is a panel assembly of photovoltaic panels. Clamps secure the panel assembly to the ground mount system. The panel assembly includes at least two rails. The rails may comprise a west Z-rail and an east Z-rail, wherein the west Z-rail and east Z-rail are formed in a "Z" shape and are mounted as mirror images on the panel assembly. Alternatively, the rails may be formed as "U" shaped rails. At least two angle plates may connect to each rail to facilitate the sliding of the panel assembly onto the sub-structure for ease of installation.

As described, the present invention provides a cost-effective and easy to assemble ground mount system for photovoltaic panels.

BRIEF DESCRIPTION OF THE DRAWINGS

The present invention will be readily understood by the following detailed description in conjunction with the accompanying drawings, wherein like reference numerals designate like structural elements, and in which:

FIG. 9 is an isometric detailed exploded view of a panel clamp, according to an embodiment of the present invention.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art. Any and all such modifications, equivalents and alternatives are intended to fall within the spirit and scope of the present invention.

Figure 1:
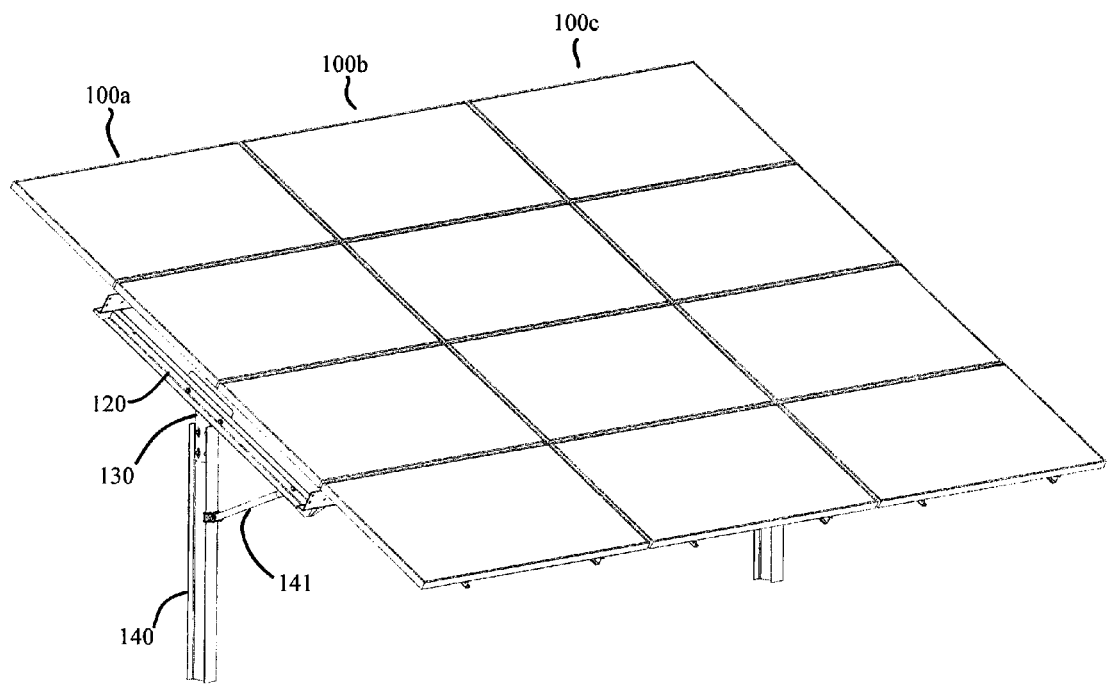
FIG. 1 shows an isometric elevation of a portion of a Large Scale Ground Mount System, according to one embodiment of the present invention.

FIG. 1 shows a portion of the Large Scale Ground Mount System, according to an embodiment of the present invention. The system comprises East/West rows of a plurality of photovoltaic panels that are assembled to the sub-structure of the Large Scale Ground Mount System. As illustrated, four photovoltaic modules are oriented in a landscape configuration and assembled together to form panel 100a, adjacent in the East direction is panel 100b, and next is panel 100c. Additional panels may be assembled to suit the desired photovoltaic ground system design. The panels may be assembled on or off of the construction site. This is often desired depending on the type and cost of labor needed for a specific system installation. The sub-structure of the system needs to be mechanically grounded to the earth in order to support the photovoltaic modules.

More particularly, FIG. 1 illustrates an isometric elevation of a portion of a Large Scale Ground Mount System. The System comprises panels 100a, 100b, and 100c that contain four photovoltaic modules mounted in a landscape orientation. An I-Beam 140 is the base and foundation for the sub-structure of the system, supporting T-Plate 130, Post Frame 120 and Kicker Brace 141.

This embodiment depicts a vertical support I-Beam 140 that is inserted into earth using a means of vibration or vibro-pile, as is known to those of skill in the art. The vertical support is typically a ferrous material such as cold rolled steel and is often preferred in the geometry of an I-Beam commonly used in the construction industry. Other geometries of the vertical support may be used such as a round tube, C-shape, Z-Shape, or Angle Shape. The vertical supports may be inserted directly into the earth or may use a foundation for support. Further components of the sub-structure include Post Frame 120 that positions horizontal supports for the sub-structure (not shown). The Post Frame 120 is connected to the vertical support I-Beam 140 with a T-Plate 130. Further support is provided for Post Frame 120 with Kicker Brace 141 which enables an additional connection path between the Post Frame 120 and I-Beam 140. The Kicker Brace 141 helps ensure that the system resists environmental forces such as wind and snow.

Figure 2:
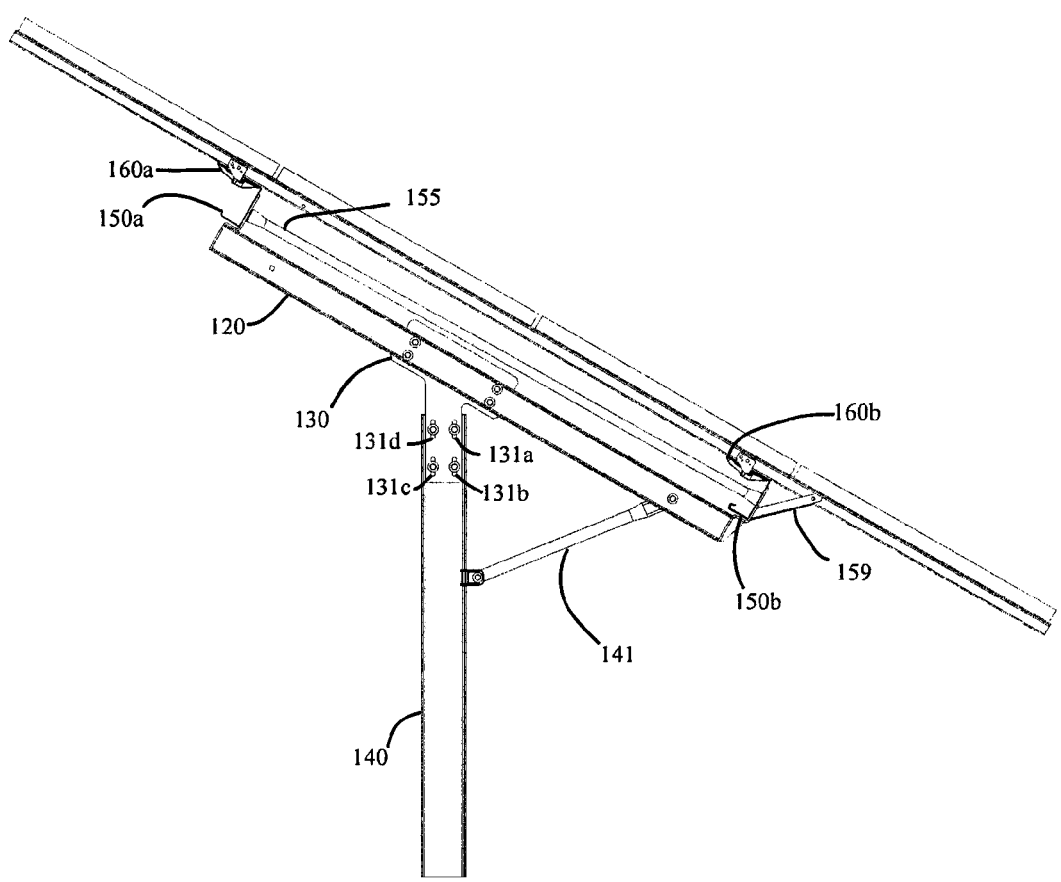
FIG. 2 illustrates an elevation side view of a Large Scale Ground Mount System, according to an embodiment of the invention.

In further detail, FIG. 2 is an elevation side view of a Large Scale Ground Mount System according to an embodiment of the present invention. The system is supported by an I-Beam 140, Kicker Brace 141, T-Plate 130, Post Frame 120, North C-Purlin 150a, South C-Purlin 150b, Purlin Tie 155, Purlin Torsion Brace 159, North Rail Clamp 160a, and a South Rail Clamp 160b.

A preferred method of installation begins with installing the vertical support members into the earth. FIG. 2 depicts vertical member I-Beam 140. Sub-structures of the system assembles to the vertical member and it is desired that there are adjustable mechanisms at every connection, since the installation site is rarely perfectly flat and often there are installation anomalies that need to be addressed. A T-Plate 130 connects portions of the sub-structure to the vertical support I-Beam 140, and the vertical slots 131a-131d allow for variations commonly encountered when installing vertical supports into the earth. Since the vertical supports are installed in a continuous fashion and in rows, variations in the height must be considered. In this embodiment, the T-Plate 130 is connected to vertical support I-Beam 140 using fasteners It is also possible to connect the T-Plate 130 to the I-Beam 140 by field welding. The T-Plate 130 connects the Post Frame 120 with an appropriate spacing for the horizontal support members. The Kicker Brace 141 adds an additional connection path between the Post Frame 120 and the vertical support I-Beam 140.

Horizontal supports of the sub-structure are installed as needed to satisfy the design of the photovoltaic system. In this embodiment, the sub-structure horizontal supports are shown as North C-Purlin 150a and South C-Purlin 150b, and are formed by cold rolling a pre-galvanized sheet into a C section. It is often desirable to have additional support between the North and South C-Purlins due to environmental forces such as wind and snow loads. The Purlin Tie 155 connects between the North C-Purlin 150a and the South C-Purlin 150b. A Purlin Tension Brace connects a portion of the panel frame to the South C-Purlin 150b. Additional horizontal support members are needed to position and secure the panels containing the photovoltaic modules. A Panel is secured to a Northern C-Purlin 150a and a Southern C-Purlin 150b using two Northern Rail Clamps 160a and two Southern Rail Clamps 160b.

Figure 3:
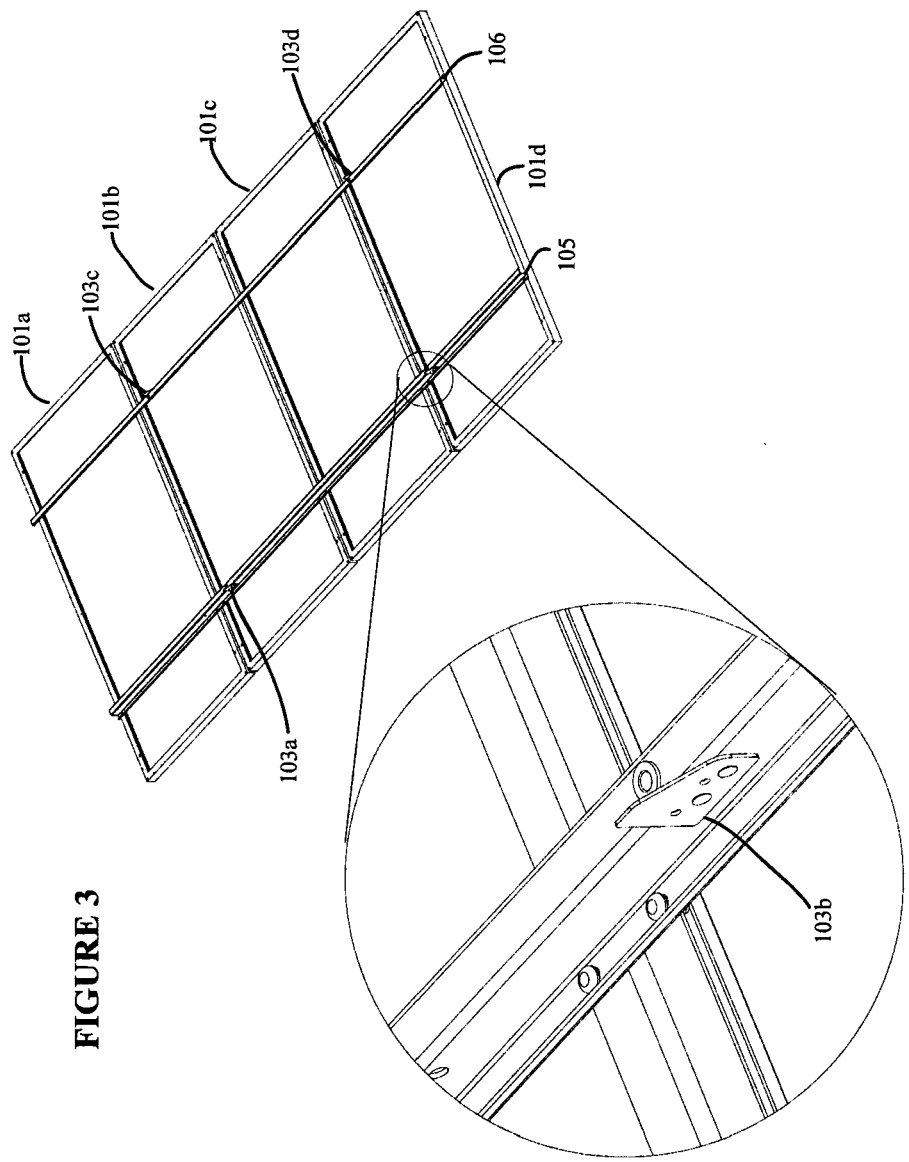
FIG. 3 is an isometric and detail view of the underside of a four by one panel system.

FIG. 3 is an isometric and detail view of the underside of a four by one Panel comprised of a plurality of Photovoltaic Modules 101a, 101b, 101c, and 101d. The Photovoltaic Modules are connected to a West Z-Rail 106 and East Z-Rail 105. The detailed view depicts an Angle Plate 103b.

In this embodiment, the Panel 100 has Photovoltaic Modules 101a-101d assembled in a landscape orientation adjacent to each other in a North/South configuration. The Photovoltaic Modules 101a-101d are each connected to an East Z-Rail 106 and a West Z-Rail 105. The Z-Rails are shown as cold rolled pre-galvanized steel in a "Z" shape. The East and West Rails are not identical, but mirror images of each other, as it is preferred that this orientation presents a better balance of load distribution opposed to using identical "Z" shapes to support the Photovoltaic Modules.

According to this embodiment, the modules are connected to the Z-Rails using fasteners, but in an alternative embodiment (not pictured) it is possible to use two "U" shaped rails and a top clamp. It is preferred to assemble a Panel 100 to the Large Scale Ground System by sliding panel Z-Rails over the sub-structure horizontal support members C-Purlins (not pictured) and Angle Plates 103a-103d are designed to allow the panels to be pushed into place over the angled surface of the Angle Plates 103a-103d and then held in position using a north edge of each angle plate. Angle Plates 103b and 103d interface with a Southern C-Purlin (not pictured) and Angle Plates 103a and 103c engage with a Northern C-Purlin (not pictured). The Angle to Plates 103a-103d may be secured to the Z-Rails with rivets, fasteners or may be welded in place.

Figure 4:
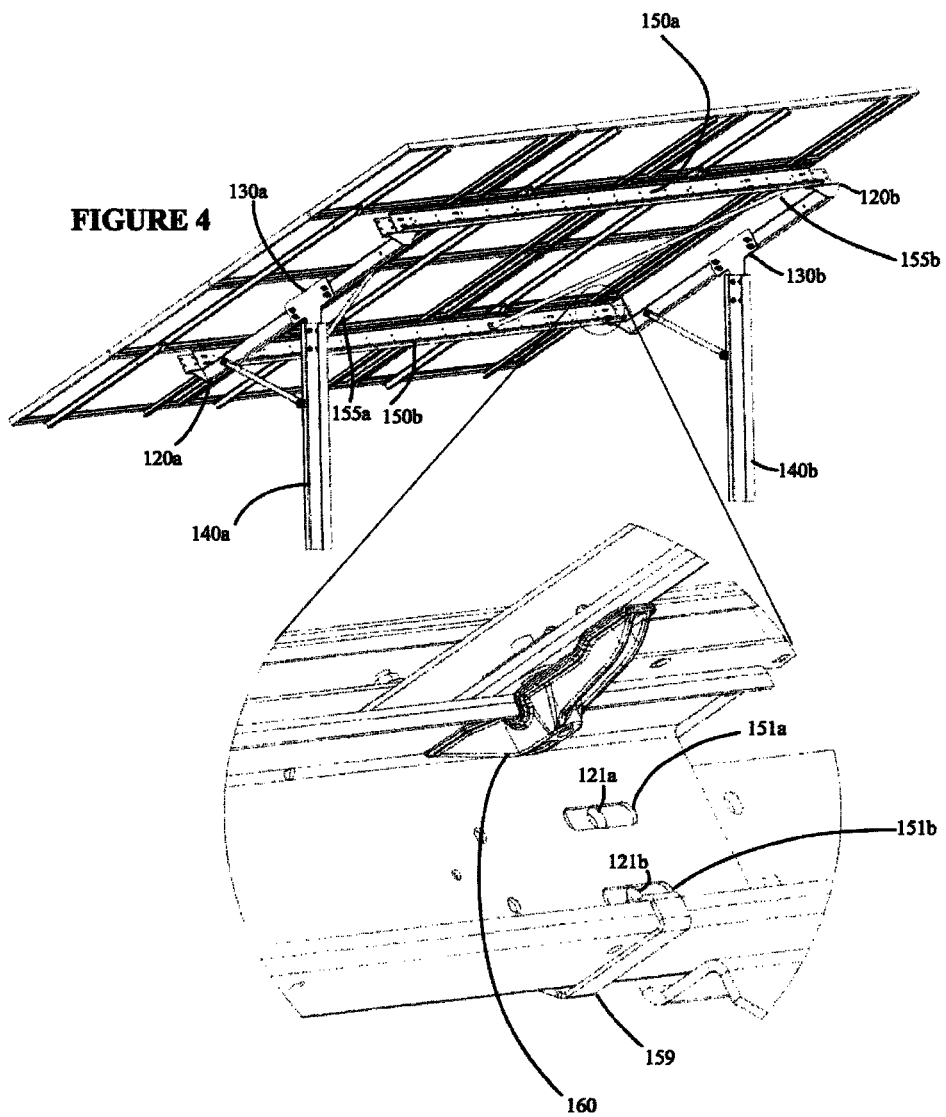
FIG. 4 is an isometric elevation and detail view of portion of a Large Scale Ground Mount System viewed from behind and underneath.

FIG. 4 depicts the underside of a portion of a Large Scale Ground Mounting System, according to an embodiment of the present invention. The vertical supports East I-Beam 140a and West I-Beam 140b connect a West Post Frame 155b with a West T-Plate 130b and East Post Frame 120a respectively. The C-Purlin to Post Frame connections need to allow for variations with the ground and therefore allow adjustment. Slots 121a and 121b in the C-Purlins connect with Post Frame through holes 151a and 151b. This connection allows for rotation and translation of C-Purlins relative to Post Frames and Posts.

Specifically, FIG. 4 illustrates an isometric elevation and detail view of portion of a Large Scale Ground Mount System, viewed from behind and underneath. The sub-structure of the system includes an East I-Beam 140a, West I-Beam 140b, East T-Plate 130a, West T-Plate 130b, East Post Frame 120a, West Post Frame 120b, South C-Purlin 150b, North C-Purlin 150a, East Purlin Tie 155a, West Purlin Tie 155b. The detailed view depicts connections between the Post Frame 120b and South C-Purlin 150b as well as connection between the four by one Panel 100 and South C-Purlin 150b through Rail Clamp 160 and Purlin Torsion Brace 159.

In order to adequately support the Panels (100a-100c) under extreme environmental forces, it is desired to have a mechanical tie between the Post Frame and the Purlins. The West Purlin Tie 155b connects a Northern C-Purlin 150a along with the top portion of the West Post Frame 120b, and ties these to Southern C-Purlin 150b. The same is true for the opposite side, An East Purlin Tie 155a connects both a North C-Purlin 150a and East Post Frame 120a with South C-Purlin 150b. Further mechanical connections are desired for extreme environmental forces between C-Purlin and Post Frame with respect to relative torsional restraint. The Purlin Torsion Brace 159 connects South C-Perlin 150b to Z-Rail (not pictured).

The connection of the Panel 100c to the substructure are made using Rail Clamp 160.

Figure 5:
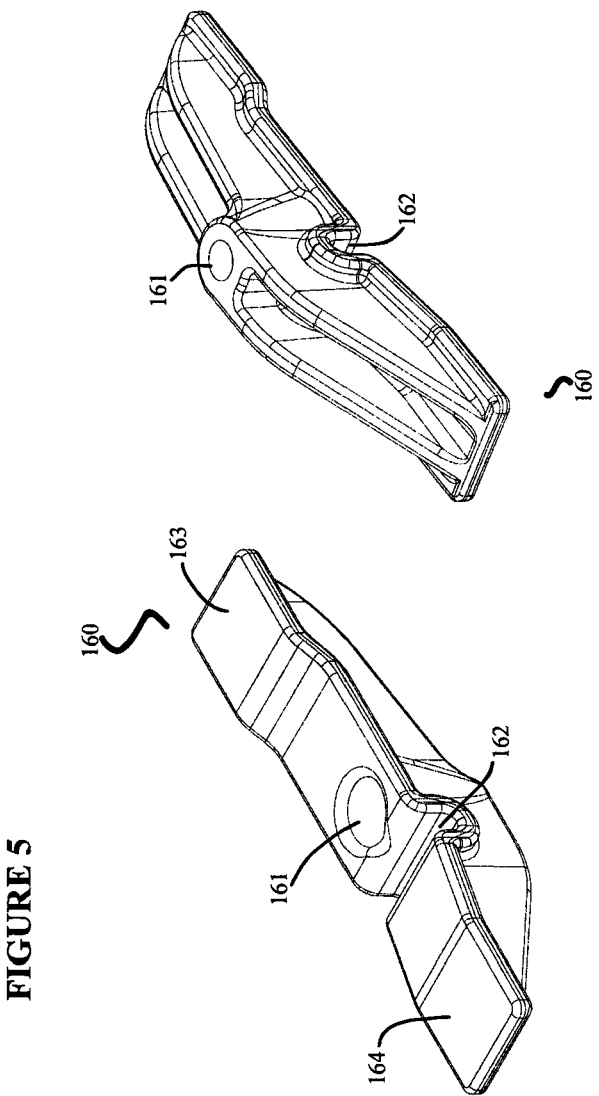
FIG. 5 is a detailed isometric view of a rail clamp, according to an embodiment of the present invention.

FIG. 5 shows two detailed isometric views of the Rail Clamp 160. Details include a Location Hole 161, a first surface 163 that interfaces with Z-Rail, a second surface 164 that interfaces with a C-Purlin, and a third surface 162 which interfaces with a C-Purlin.

The Rail Clamp 160 is preferably made using a casting process of ductile iron, and contains a through hole feature 161 to allow a fastener to secure it positively to the Z-Rails of a Panel (not pictured). The first surface 163 positively engages with the Z-Rail to create a normal force that adequately secures the Panel to the system's sub-structure. The third surface 162 and second surface 164 positively engage with the C-Purlin (not pictured) in order to adequately secure the Panel to the sub-structure.

Figure 6:
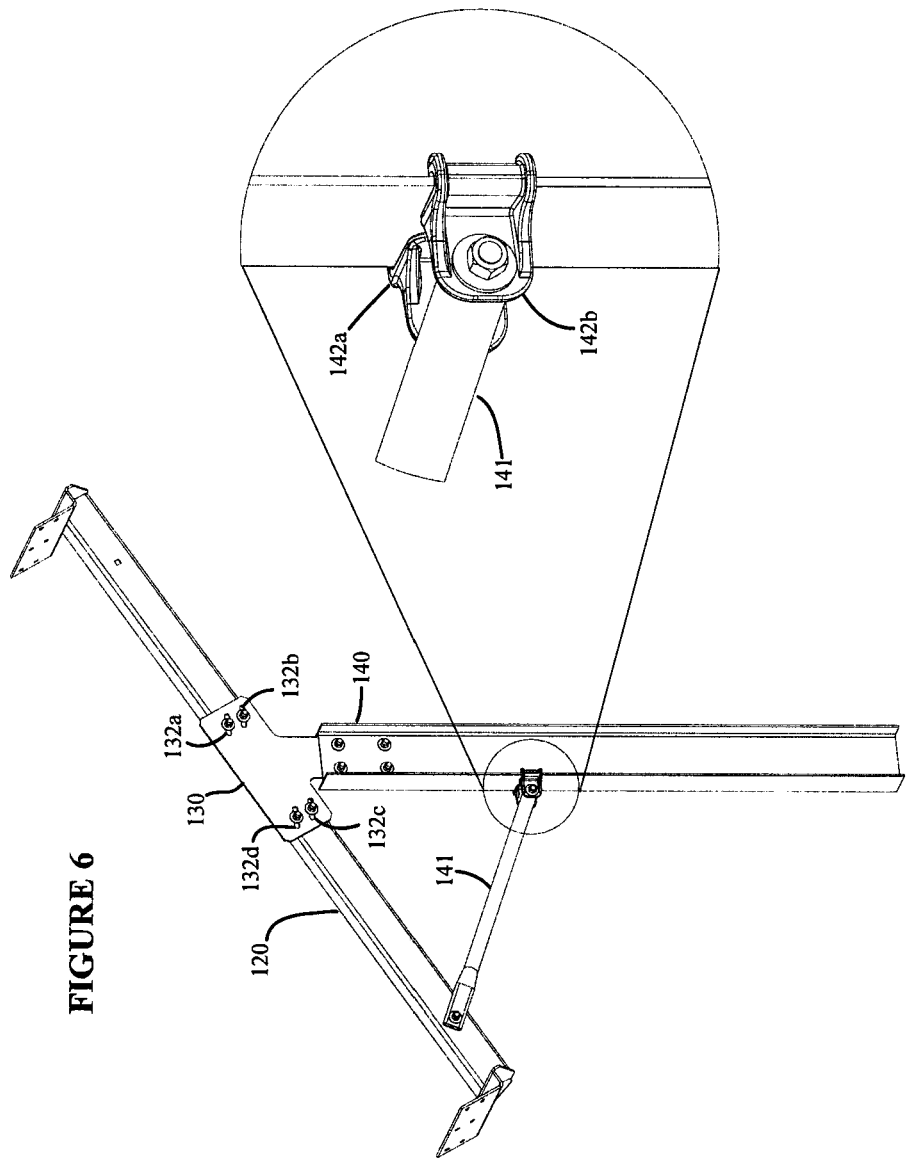
FIG. 6 is an isometric elevation of post portion of sub-structure of a Large Scale Ground Mount System.

It is often desirable to be able to vary the tilt angle of the Panels for a given installation. FIG. 6 illustrates the connection between portions of the sub-structure that allow the Kicker Brace 141 to slide up and down relative to the vertical member I-Beam 140. This allows an installer to adjust the angle of the T-Plate 130 and the length of the Kicker Brace 141. In this embodiment, the Kicker Brace 141 is shown as a steel tube that is flattened, or swaged as is known in the art, with a hole on the connection to the Post Frame 120, and a hole drilled through the Post 140 end. On the Post end the Kicker Brace 141 is secured using a fastener through the hole and West Kicker Clip 142a and East Kicker Clip 142b. The fastener, when secured with a fastener nut (not pictured) acts to secure the Kicker Clip 142a and 142b to the I-Beam flange.

If further adjustment is desired between the Post Frame 120 and I-Beam 140, this may be achieved with slots 132a-132d in the T-Plate 130 and four holes (not pictured) adequately spaced to align with the slot positions.

As shown in FIG. 6, a Ground Mount System comprises an I-Beam (post) 140, Kicker Brace 141, Post Frame 120, T-Plate 130. The Detail view depicts the connection between the Kicker Brace 141 and I-Beam 140 with West Kicker Clip 142a and East Kicker Clip 142b.

Figure 7:
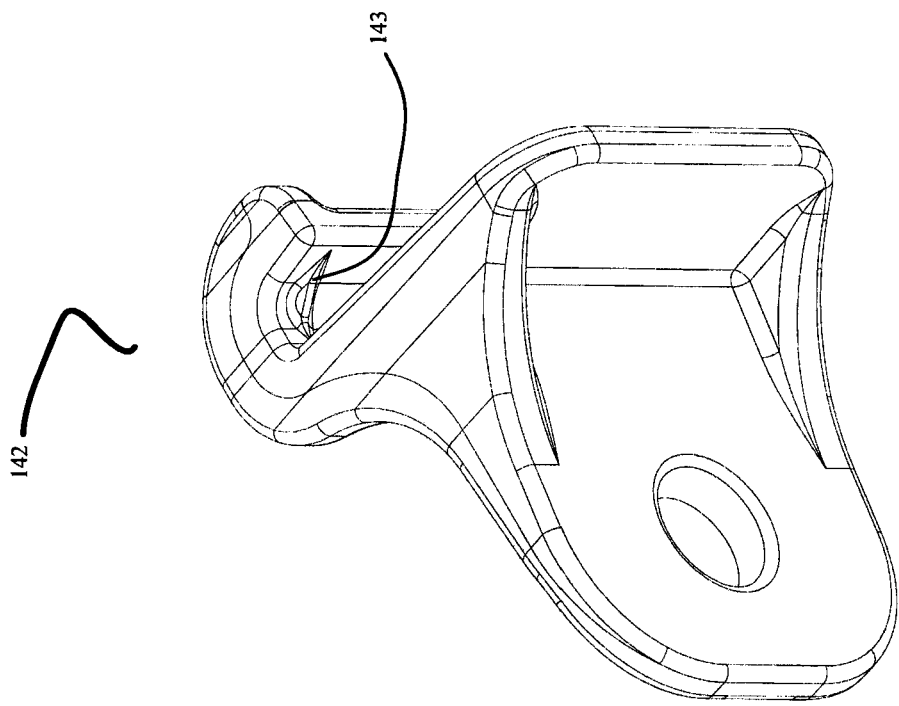
FIG. 7 is an isometric elevation detail of a Kicker Clip, according to an embodiment of the present invention.

FIG. 7 is an isometric elevation detail view of the Kicker Clip 142, depicting tooth 143 for interfacing with an I-Beam. The Kicker Clip 142 is preferably cast as ductile iron material. Two teeth are located inside a channel-tooth 143 exists to positively engage with an I-Beam flange to ensure solid immovable connection when the Kicker Brace is fully tightened with a fastener and fastener nut.

Figure 8:
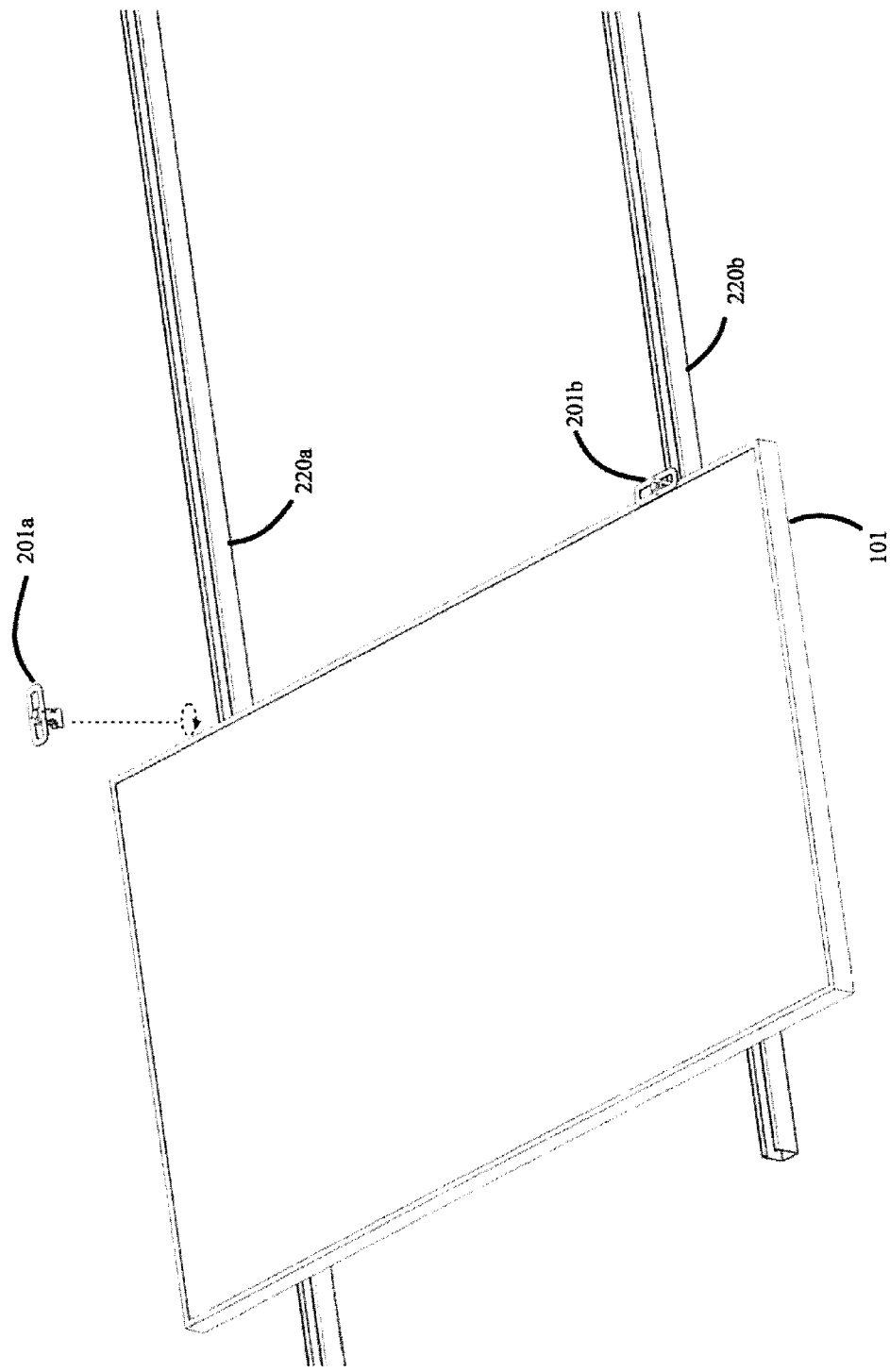
FIG. 8 is an isometric exploded assembly of a panel being assembled.

FIG. 8 illustrates an alternative embodiment of the design of FIG. 3. The embodiment of FIG. 8 includes alternative U-rails, 220a and 220b, as opposed to the Z rails. In a preferred configuration, a Northern Panel Clamp assembly 201a is shipped to the customer in an assembled state, and may simply be lowered into place in between the U-rails open channel, and then rotated 90° as shown with the Southern Panel Clamp 201b. Once the Panel Clamps are in place, the next photovoltaic module (not pictured) may be slid adjacent to Clamps 201a and 201b. Finally the Clamps may be tightened. The clamps are designed to be installed very quickly, while providing enough strength to resist environmental forces such as wind and snow loading. The clamps, when secured in place, also provide an adequate electrical ground path from the photovoltaic module through the U-rails.

As shown in FIG. 8, the panel comprises photovoltaic module 101, north U-rail 220a, and south U-rail 220b. A north panel clamp assembly 201a is shown prior to its secured state and south panel clamp assembly 201b is shown secured.

FIG. 9 is an isometric detailed exploded view of panel clamp 201. Depicted are Panel Clamp Top 202, Panel Clamp T 203, bolt 204, and nut 205. The assembly consists of a Panel Top Clamp 202 with features to accept bolt 204 and align to Panel T Clamp 203. The Panel T Clamp also allows for a nut 205 to be assembled inside of its surfaces to adequately hold the nut in place while tightening the bolt. Both the Panel Top Clamp and Panel T Clamp contain features to electrically bond to other panel components that they are assembled to, i.e. the U-rail and photovoltaic module.

Those skilled in the art will appreciate that various adaptations and modifications of the just described preferred embodiments can be configured without departing from the scope and spirit of the invention. Therefore, it is to be understood that, within the scope of the appended claims, the invention may be practiced other than as specifically described herein.

What is claimed is:

1. A ground mount system for photovoltaic panels, the system comprising:
   at least two vertical supports, wherein attached to each vertical support are:
      a flat T plate having a vertical segment and a crossing segment, wherein the vertical segment and crossing segment are not perpendicular, the vertical segment connected to a vertical support;
      a post frame connected to the crossing segment of the flat T plate, the length of the post frame being greater than the length of the crossing segment;
      a kicker brace connected between the vertical support and the post frame;
      a first C-Purlin connected to a first end of the post frame;
      a second C-Purlin connected to a second end of the post frame;
      a panel assembly frame of photovoltaic panels;
      a purlin tie connected between the first C-Purlin and the second C-Purlin, the purlin tie aligned beneath the panel assembly frame;
      at least two north rail clamps; and
      at least two south rail clamps;
   wherein the north and south rail clamps secure the panel assembly frame to the first and second C-Purlins, respectively.

2. The ground mount system of claim 1, further comprising:
   a purlin torsion brace connected between the second C-Purlin and the panel assembly frame.

3. The ground mount system of claim 1, wherein the T plate has vertical slots to allow for variations in ground height during assembly.

4. The ground mount system of claim 1, wherein the panel assembly frame comprises:
   a west U-rail and an east U-rail formed in a "U" shape, and at least one panel clamp assembly to attach each photovoltaic panel to the U-rails.

5. The ground mount system of claim 4, wherein the panel clamp assembly comprises:
   a panel clamp top;
   a panel clamp T configured to slide into a U-rail and twist 90 degrees to secure the clamp in the U-rail; and
   a bolt and nut attaching the panel clamp top and the panel clamp T.

6. A ground mount system for photovoltaic panels, the system comprising:
   at least two vertical supports, wherein attached to each vertical support are:
      a flat T plate having a vertical segment and a crossing segment, wherein the vertical segment and crossing segment are not perpendicular, the vertical segment connected to a vertical support;
      a post frame connected to the crossing segment of the flat T plate the length of the post frame being greater than the length of the crossing segment; and
      a kicker brace connected between the vertical support and the post frame;
      a first C-Purlin connected to a first end of the post frame;
      a second C-Purlin connected to a second end of the post frame;
      a purlin tie connected between the first C-Purlin and the second C-Purlin, the purlin tie aligned above the post frame;

a photovoltaic panel assembly frame, the assembly frame comprising a plurality of photovoltaic panels, at least two rails, and at least two angle plates;
at least two north rail clamps; and
at least two south rail clamps;
wherein the north and south rail clamps secure the panel assembly to the first and second C-Purlins, respectively.

7. The ground mount system of claim 6, wherein the kicker brace connects to the vertical support with two kicker clips.

8. The ground mount system of claim 7, wherein each kicker clip comprises at least one tooth to engage the vertical support.

9. The ground mount system of claim 6, further comprising a purlin torsion brace connected between the second C-Purlin and the panel assembly frame.

* * * * *